United States Patent
Johnston

(10) Patent No.: US 6,315,357 B1
(45) Date of Patent: Nov. 13, 2001

(54) RETRACTABLE GARMENT HANGER ASSEMBLY

(75) Inventor: Kent E. Johnston, Birmingham, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/643,615

(22) Filed: Aug. 22, 2000

(51) Int. Cl.$^7$ .................................................. B60J 7/00
(52) U.S. Cl. ............................ 296/214; 296/1.1; 224/313
(58) Field of Search ..................... 296/214, 1.1; 224/313

(56) References Cited

U.S. PATENT DOCUMENTS

| | | |
|---|---|---|
| 2,447,908 | 8/1948 | Hoots . |
| 2,542,163 | 2/1951 | Swalwell . |
| 4,221,354 | 9/1980 | Kempkers . |
| 4,444,344 * | 4/1984 | Narcus et al. ....................... 224/313 |
| 4,664,267 | 5/1987 | Clark . |
| 4,720,028 * | 1/1988 | Takemura et al. ................... 224/313 |
| 4,936,491 | 6/1990 | Calad et al. . |
| 4,981,323 * | 1/1991 | Dowd et al. ......................... 296/214 |
| 5,121,844 * | 6/1992 | Ball .................................... 224/313 |
| 5,147,078 * | 9/1992 | Flieder ................................ 224/313 |
| 5,226,569 * | 7/1993 | Watjer et al. ....................... 224/313 |
| 5,328,068 * | 7/1994 | Shannon .............................. 224/313 |
| 5,363,975 | 11/1994 | Meade . |
| 5,366,127 * | 11/1994 | Heinz .................................. 224/313 |
| 5,411,233 * | 5/1995 | Grimes, III et al. ................ 224/313 |
| 5,419,067 * | 5/1995 | Drummond et al. ................ 224/313 |
| 5,492,260 * | 2/1996 | Rieden et al. ....................... 224/313 |
| 5,507,423 | 4/1996 | Fischer et al. . |
| 5,625,921 | 5/1997 | Smith . |
| 5,820,205 * | 10/1998 | Ammons ............................. 296/214 |
| 5,855,408 * | 1/1999 | Rickabus ............................. 296/214 |
| 5,894,968 * | 4/1999 | Christensen ........................ 224/313 |
| 5,975,606 * | 11/1999 | Forbes et al. ...................... 296/214 |
| 6,065,657 * | 5/2000 | Fischer ............................... 224/313 |
| 6,095,469 * | 8/2000 | Von Alman ........................ 224/313 |

\* cited by examiner

*Primary Examiner*—Joseph D. Pape
*Assistant Examiner*—Kiran B. Patel

(57) ABSTRACT

A retractable garment hanger assembly for a motor vehicle is provided. The garment hanger assembly includes a hanger bar, preferably formed in a zigzag or saw tooth pattern that is adapted to receive garment hangers. Hanger bar is attached to a biasing mechanism via a first and second cord. Biasing mechanism includes a spiral spring and a rotatable disk that is coupled with the first and second cord. The biasing mechanism provides continuous upward force to the hanger bar continuously urging the hanger bar in contact with the vehicle body.

13 Claims, 3 Drawing Sheets

RETRACTABLE GARMENT HANGER ASSEMBLY

BACKGROUND OF THE INVENTION

1. Technical Field

The present invention relates in general to motor vehicles. More particularly, the present invention relates to a truly unique and versatile garment hanger assembly for motor vehicles. More specifically, but without restriction to the particular embodiment and/or use which is shown and described for purposes of illustration, the present invention relates to a garment hanger assembly for a motor vehicle that is retractable.

2. Discussion

Typically, motor vehicles are equipped with at least one relatively small hook disposed near the headliner of the vehicle for receiving garment hangers. The standard hook needed to be small so as to not interfere with the headroom for the occupant. Unfortunately, this resulted in relatively small hooks that could only accommodate one or possibly two hangers. Additionally, the small hooks were not very effective in positively maintaining the hangers in contact therewith during sudden maneuvers of the motor vehicle. Sudden maneuvers of the motor vehicle often resulted in the hangers, and ultimately the garment, falling to the seats or the floor of the vehicle. Some manufacturers, in an effort to alleviate this problem, began producing larger hooks, however, this lead to reduced headroom problems for the occupants.

Manufacturers then began, for aesthetic and packaging reasons, producing garment hangers that are retractable or pivotable into a recess. For example, U.S. Pat. No. 4,221,354 assigned to Prince Corporation provides a hook that is pivotally mounted within a recess in the headliner and pivots between a stored position and lower position for use. Another example is disclosed in U.S. Pat. No. 5,507,423 assigned to Prince Corporation. This patent teaches a hook that is retractable into a recess when not in use, in order to retract the hanger, the occupant must force the hanger into the recess. Although such devices perform satisfactorily, they are often only able to accommodate one or two hangers. There is, therefore, a need to provide a retractable hook that can accommodate a significant number of hangers. There is also a need to provide a garment hanger that is retractable without any input from the occupant of the vehicle.

SUMMARY OF THE INVENTION

Accordingly, it is the principal objective of the present invention to provide a truly unique and versatile garment hanger assembly.

It is another objective of the present invention to provide a garment hanger assembly that can accommodate a significant number of hangers.

It is yet another objective of the present invention to provide a garment hanger assembly that is self-retractable.

In one form, the present invention concerns a retractable garment hanger assembly for a motor vehicle. The garment hanger assembly includes a hanger bar, preferably formed in a zigzag or saw tooth pattern that is adapted to receive garment hangers. Hanger bar is attached to a biasing mechanism via a first and second cord. It should be noted that although the preferred embodiment employs a first and second cord, the invention may be utilized using only one cord that connects to the hanger bar at both ends. Biasing mechanism includes a spiral spring and a rotatable disk that is coupled with the first and second cord. The biasing mechanism provides continuous upward force to the hanger bar continuously urging the hanger bar in contact with the vehicle body.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be read in conjunction therewith, and like reference numerals are employed to designate identical components in various views.

DETAILED DESCRIPTION OF THE PREFERRED EMBODIMENT

A new and truly versatile garment hanger assembly is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
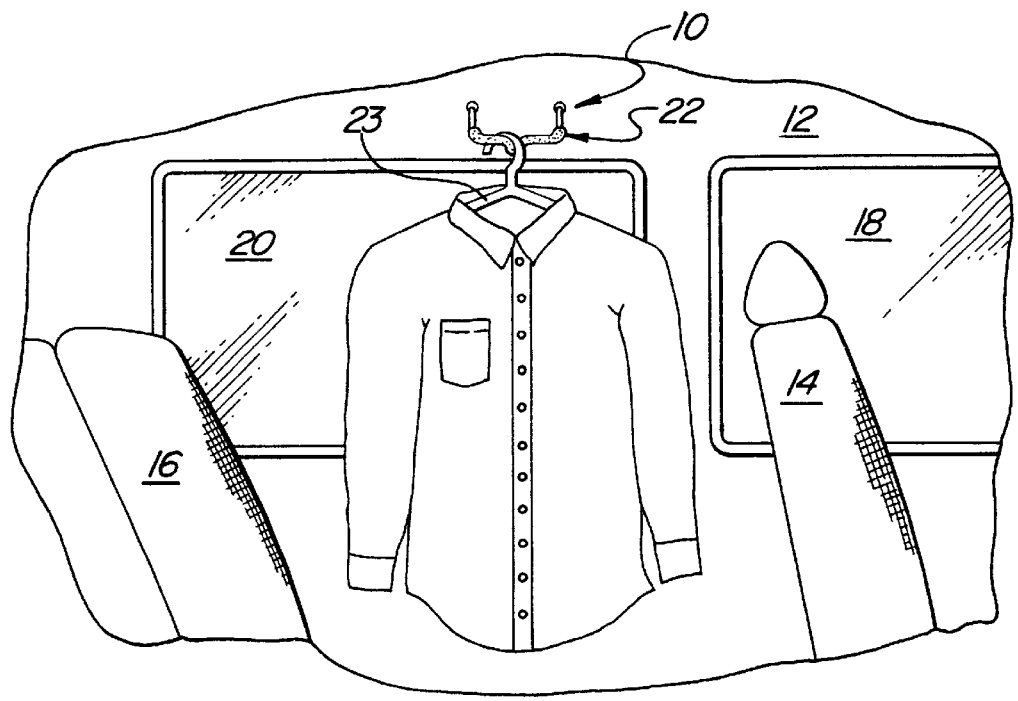
FIG. 1 is a view of the passenger cabin of a motor vehicle including an embodiment of the garment hanger assembly of the present invention.

Referring now to the drawings, FIG. 1 illustrates the environment in which the garment hanger assembly 10 of the present invention is preferably employed. The garment hanger assembly 10 is disposed within the passenger compartment 12 of a motor vehicle. The passenger compartment 12 includes preferably a front seat 14 and a rear seat 16. The passenger compartment 12 also includes a front window 18 and a rear window 20. The garment hanger assembly includes a hanger bar 22 that is adapted to receive a hanger 23. The hanger bar 22 and the garment hanger assembly 10 will be described in more detail subsequently.

Figure 2:
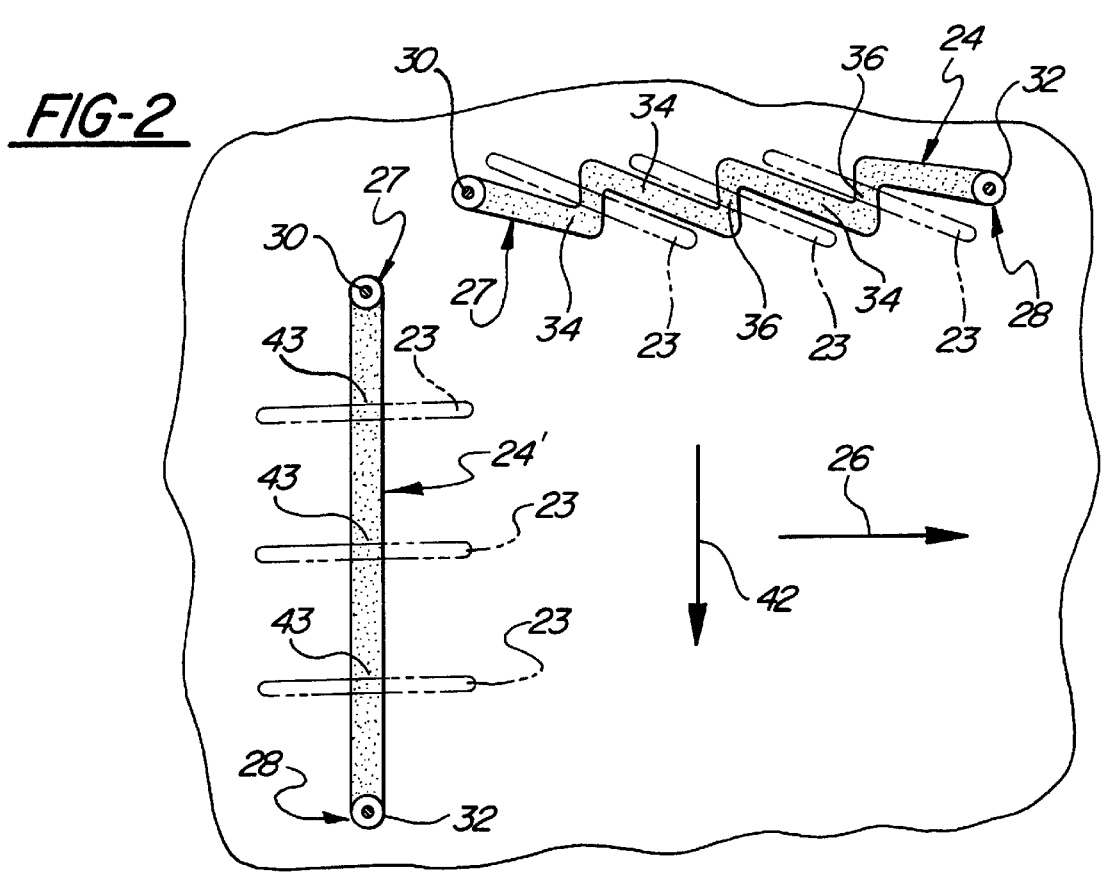
FIG. 2 is a bottom view of a headliner of the passenger cabin of the motor vehicle illustrating two embodiments of the present invention.

Turning to FIG. 2, two different hanger bars are illustrated from a perspective below the garment hanger assembly 10. The preferred hanger bar 24 is disposed such that it extends in the longitudinal direction towards the front of the car as depicted by arrow 26. Hanger bar 24 is attached to the vehicle at its opposing ends 27 and 28 via a first and second cord 30 and 32, respectively. It should be appreciated that the first and second cord may be substituted with a single cord having the hanger bar 24 injection molded around it or crimped thereon. The preferred hanger bar 24 includes a zigzag or saw-tooth pattern. The pattern includes a series of alternating longitudinally angled segments 34 and lateral segments 36. The lateral segments 36 extend substantially laterally in a cross car direction 42. Lateral segments 36 are adapted to receive hangers 23 so that the garment will extend substantially in the longitudinal direction 26. In the preferred embodiment, three hangers 23 can be accommodated by hanger bar 24, it should be appreciated, however, that a far greater number of hangers can be accommodated by either increasing the number of laterally extending segments 36 or by increasing the length of at least one laterally extending segment 36.

The hanger bar can also be disposed in an alternate embodiment that is illustrated by numeral 24'. This embodiment of the hanger bar 24' is preferably disposed extending in the lateral or cross car direction 42. Hanger bar 24' is also connected to the vehicle by cords 30 and 32 at a first and second end 27 and 28 thereof. Hanger bar 24' has, preferably, a plurality of notches 43 to aid in securing hangers 23 laterally thereon. Notches 43 are best illustrated in FIG. 5.

Figure 3:
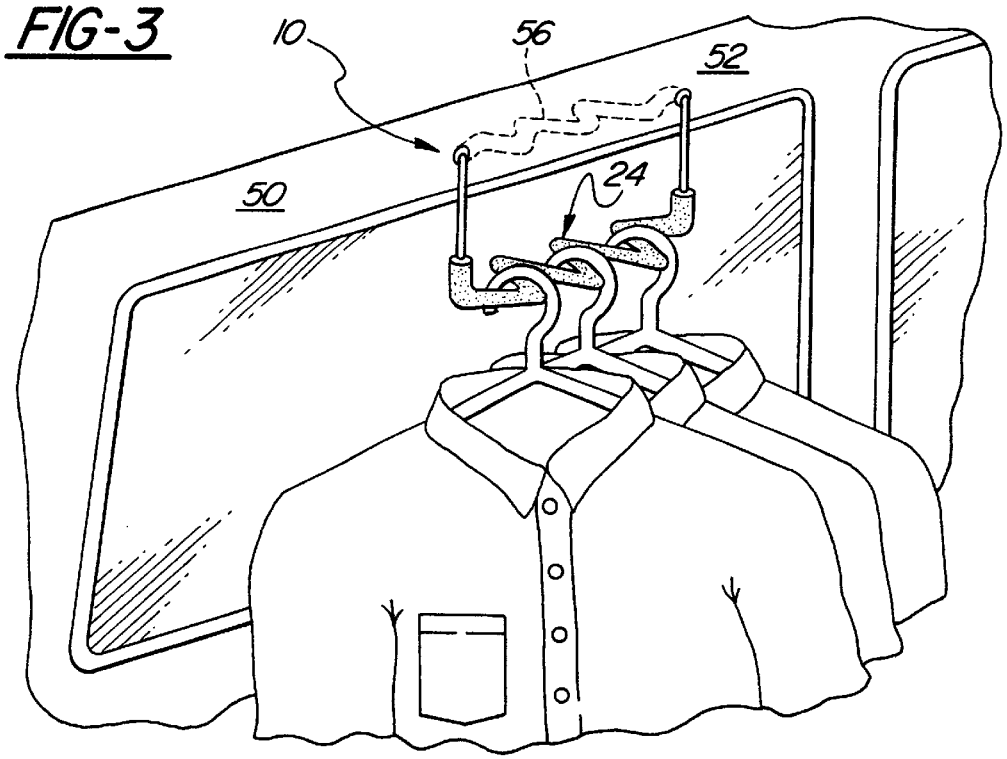
FIG. 3 is a perspective view of the preferred embodiment of the present invention in the deployed position.

FIG. 3 illustrates the preferred hanger bar 24 of the garment hanger assembly 10. Hanger bar 24 is attached to the vehicle (referred to generally by numeral 50). Hanger bar 24 is illustrated in its use position in FIG. 3, the use position is defined as any position sufficiently away from the headliner 52 such that hangers 23 or other similar objects can be placed between the headliner 52 and the hanger bar 24. Hanger bar 24 is self-retractable to a stowed position such that hanger bar 24 is disposed substantially within a recess 56 disposed in the headliner 52. Force upon hanger bar 24 is required to transition the hanger bar 24 between the stowed and use positions. To facilitate this transition hanger bar 24 or 24' may be equipped with a handle or other type of gripping means such as the gripping location 60 best shown in FIG. 5.

Figure 4:
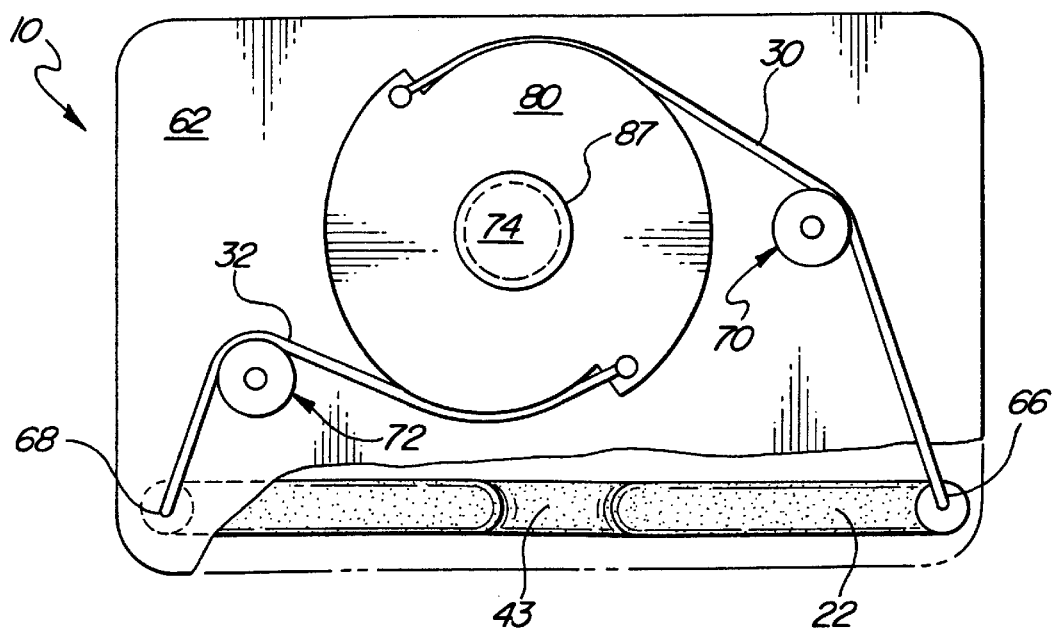
FIG. 4 is a top view of the garment hanger assembly of the present invention with the headliner and vehicle body removed therefrom.
Figure 5:
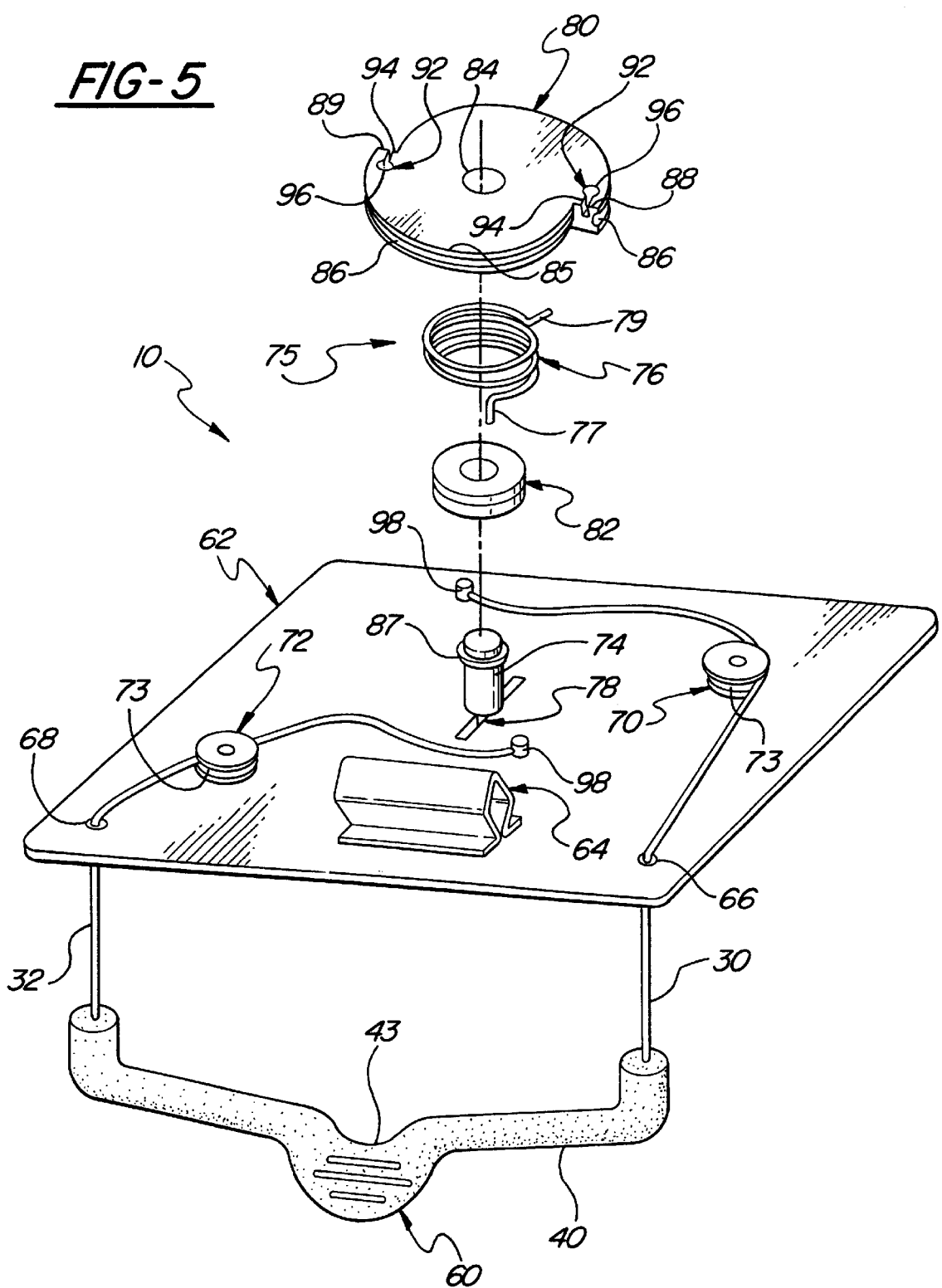
FIG. 5 is an exploded view of the garment hanger assembly of the present invention.

Now referring to FIGS. 4 and 5, the garment hanger apparatus includes a plate 62 that is adapted to be attached to the vehicle via clip 64 formed thereon. Clip 64 is formed so as to be securably fastened within an aperture formed in the vehicle (not shown). It should be appreciated that many alternate methods, such as via a screw, welding or adhesive, are acceptable for attaching the plate 62 to the vehicle. Plate 62 includes a first hole 66 for receiving first cord 30 and a second hole 68 for receiving second cord 32. Plate 62 also includes a first and second roller 70 and 72 preferably rotatably attached thereto. The first roller 70 is adapted to contact the first cord 30 and the second roller 72 is adapted to contact the second cord 32. Each roller 70, 72 includes a groove 73 formed about the circumference thereof to receive a cord 30 or 32. Both rollers 70 and 72 may be integrally formed in a fixed relationship with plate 62 such that cords 30, 32 slide about their circumference.

A cylindrical projection 74 is preferably located near the center of plate 62 that acts to position a biasing mechanism 75. The biasing mechanism 75 includes a spiral spring 76 which is disposed such that it circumscribes the cylindrical projection 74. Spiral spring 76 attaches to plate 62 at one end 77 via a slot 78 formed therein and attaches to a biasing disc 80 on the other end 79. A viscous damping mechanism 82 is disposed near spring 76 to provide controlled biasing of the spring 76. Biasing disc 80 includes a centrally located aperture 84 to provide locking rotatable attachment to the cylindrical projection 74 which includes a small ridge 87 to provide the desired attachment while not restricting rotational movement of the biasing disc 80. Biasing disc 80 includes an outer perimeter 85 having a groove 86 formed therein. Groove 86 has a semi-circular cross sectional shape. Perimeter 85 includes two set off portions 88 and 89 disposed on opposite sides of disc 80. Set off portion 88 is adapted to attach to first cord 30 and set off portion 89 is adapted to attach to second cord 32. Each set off portion 88 and 89 includes a slot 92 that includes a narrow channel 94 terminating in a wider end 96. Slot 92 is adapted to receive end 98 of one of the cords 30 or 32.

In its assembled form, as illustrated in FIG. 4, cord 30 is attached to one side of biasing disc 80. Cord 30 extends and contacts the first roller 70 and extends through hole 66 where it contacts hanger bar 24. Cord 32 is attached to the opposing side of biasing disc 80 and extends to contact second roller 72 and also extends through hole 68 where it contacts hanger bar 24. As force is applied to hanger bar 24 in the generally downward direction, biasing disc 80 is rotated in a clockwise direction against the tendencies of spring 76. Downward force can be created by an occupant of the vehicle and maintained by the weight of a garment hanger 23. The distance that the hanger bar 24 is deployed downward from the headliner 52 is a function of the downward force exerted and the spring constant of spring 76. Spring 76, along with other portions of the garment hanger assembly 10, act to continuously urge the hanger bar 24 towards the vehicle body 50. As the downward force is diminished or eliminated, spring 76 acts to retract hanger bar 24 into its stowed position such that hanger bar 24 is disposed in recess 56. It should be appreciated that after biasing disc 80 has rotated a sufficient amount; no more rotation will increase the deployment distance. It should further be appreciated that an artificial stop can also be employed to limit further rotation of disc 80 and consequently the deployment distance.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A garment hanger assembly for a motor vehicle having a body, said garment hanger assembly comprising:

a hanger bar adapted for receiving garment hangers;

a biasing element;

at least one cord operatively interconnecting said biasing element and said hanger bar.

2. The garment hanger assembly as set forth in claim 1, wherein said biasing element is a spiral spring.

3. The garment hanger assembly as set forth in claim 1, wherein said hanger bar includes a first and second end, said first end being interconnected to a cord and said second end being interconnected to said cord, said first cord attached to a biasing disc such that movement of said hanger bar will cause said biasing disc to rotate.

4. The garment hanger assembly as set forth in claim 1, wherein said hanger bar includes a first and second end, said first end being interconnected to a first cord and said second end being interconnected to a second cord, said first cord and said second cord attached to a biasing disc such that movement of said hanger bar will cause said biasing disc to rotate.

5. The garment hanger assembly as set forth in claim 4, wherein said biasing element is coupled to said vehicle body and secured to said biasing disc to continuously urge said hanger bar towards said vehicle body.

6. The garment hanger assembly as set forth in claim 5, wherein said hanger bar includes at least one notch formed thereon for the reception of a garment hanger.

7. The garment hanger assembly as set forth in claim 6, wherein said hanger bar extends laterally in the vehicle.

8. The garment hanger assembly as set forth in claim 5, wherein said hanger bar extends longitudinally within the vehicle and includes a plurality of laterally extending segments, at least two of said laterally extending segments being interconnected by a longitudinally angled segment wherein said laterally extending portions are adapted to receive a garment hanger such that a garment hanger received by said laterally extending portions extends substantially in the longitudinal direction.

9. The garment hanger assembly as set forth in claim 7, wherein said hanger bar includes a gripping location to aid with the movement of said hanger bar against the urging of said biasing element.

10. The garment hanger assembly as set forth in claim 8, wherein said vehicle body includes a recess formed therein for reception of said hanger bar in a stowed position.

11. A garment hanger assembly for a vehicle having a vehicle body and a headliner, said garment hanger assembly comprising:

a hanger bar connected to the headliner of the vehicle, said hanger bar extends longitudinally within the vehicle and includes a plurality of laterally extending segments, at least two of said laterally extending segments being interconnected by a longitudinally angled segment wherein said laterally extending segments are adapted to receive a garment hanger such that the garment hanger received by said laterally extending segments extends substantially in the longitudinal direction of the vehicle.

12. A garment hanger assembly for a vehicle having a vehicle body and a headliner, said garment hanger assembly comprising:

a hanger bar connected to the headliner of the vehicle, said hanger bar extends longitudinally within the vehicle and includes a plurality of laterally extending segments, at least two of said laterally extending segments being interconnected by a longitudinally angled segment wherein said laterally extending segments are adapted to receive a garment hanger such that the garment hanger received by said laterally extending segments extends substantially in the longitudinal direction of the vehicle, wherein said hanger bar includes a first end and a second end;

a first cord attached to said first end of said hanger bar;

a second cord attached to said second end of said hanger bar;

a rotatable biasing disc coupled to said first cord and said second cord, such that movement of said hanger bar will cause said biasing disc to rotate;

a spring element connected to said biasing disc to continuously urge said hanger bar towards the headliner of the vehicle.

13. The garment hanger assembly as set forth in claim 5, wherein said hanger bar extends longitudinally within the vehicle and includes a plurality of laterally extending segments, at least two of said laterally extending segments being interconnected by a longitudinally angled segment wherein said laterally extending segments are adapted to receive a garment hanger such that a garment hanger received by said laterally extending segments extends substantially in the longitudinal direction.

\* \* \* \* \*